May 9, 1944.  F. F. JENKINS  2,348,477
PIPE AND METHOD OF MAKING SAME
Filed July 31, 1942
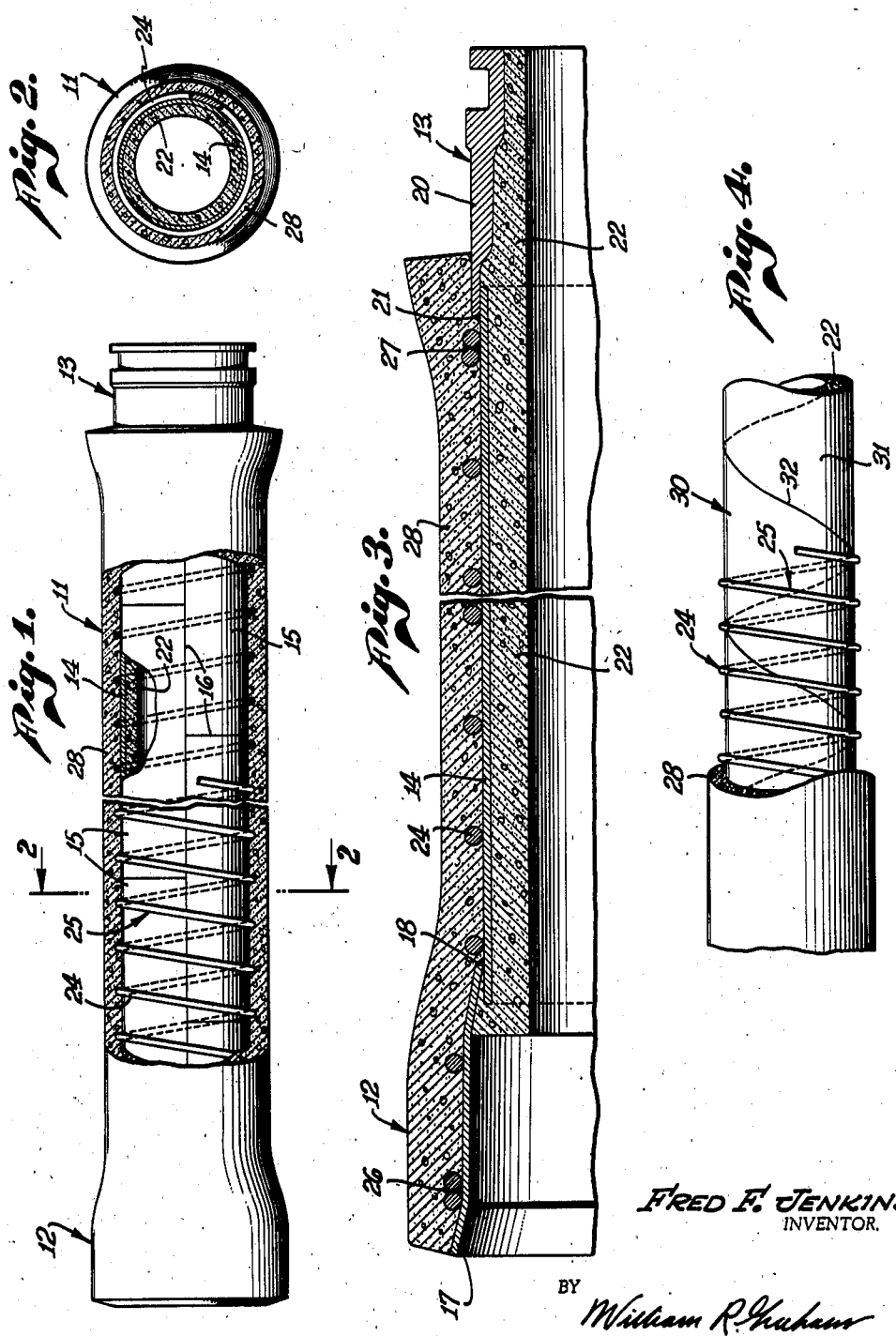
FRED F. JENKINS,
INVENTOR.
BY William R. Graham
ATTORNEY.

Patented May 9, 1944

2,348,477

UNITED STATES PATENT OFFICE 2,348,477

PIPE AND METHOD OF MAKING SAME

Fred F. Jenkins, Lynwood, Calif., assignor to American Pipe and Construction Co., a corporation of Delaware Application July 31, 1942, Serial No. 453,085

1 Claim. (Cl. 138—84)

This invention relates generally to pipe, particularly composite pipe formed of steel and concrete.

It is a primary object of my invention to provide a simple, new and improved pipe of the type embodying a reinforced shell or tube of shell embedded in concrete and a method of making such composite pipe.

One particular type of pipe which has been successfully used for pipe lines of medium to large diameter is a pipe having a tubular steel shell with an inner lining of centrifugally spun concrete and an outer coating of concrete of appreciable thickness and including a suitable reinforcement means in the form of longitudinal steel rods or a so-called steel reinforcement cage. The advantages of concrete pipe having a steel tube embedded in the concrete are well known to those in the art. However, a disadvantage of this type of pipe is the fact that ordinarily a different gage of steel plate must be used for fabricating the tubular shell to make different sizes and strengths of pipe, the gage depending upon the size of the pipe and the particular loads that the pipe must be built to withstand under given conditions. This is disadvantageous under normal conditions and under present war time allocation of materials it is often impossible to obtain the gages and sizes of steel plate required.

It is an object of my invention to provide a new and improved construction of the same general type of steel shell construction referred to which utilizes the same thickness of steel plate in the tube or shell for various sizes and various strengths of pipe thereby making for simplicity and standardization of design. It is also an object of my invention to utilize a relatively thin tube or shell in a pipe and to employ a reinforcement means cooperatively associated with the tube to stiffen it and to increase the rigidity of the completed pipe and thereby provide the desired strength characteristics. In reality my reinforcement means forms a composite shell, the strength of which can be easily varied without varying the thickness of the steel sheet or plate forming the solid steel wall of the composite shell. In this connection it is an object to provide a composite shell in which a part is under tension and a part is under compression.

It is a further object of my invention to provide a new type of reinforcement means which serves to bond the outer coating of concrete to the steel shell and which eliminates the necessity of the usual type of wire mesh, steel cage or the like about the shell and embedded in the concrete.

These and other objects will be apparent from the drawing and the following description thereof. Referring to the drawing, which is for illustrative purposes only—

Fig. 1 is an elevation and sectional view of a composite pipe embodying a form of my invention;

Fig. 2 is a cross section on line 2—2 of Fig. 1;

Fig. 3 is a fragmentary longitudinal sectional view of the pipe; and

Fig. 4 is a fragmentary elevation partly in section of a pipe embodying another form of the invention.

More particularly describing the invention, reference numeral 11 indicates a composite pipe embodying the invention and having a bell end 12 and a spigot end 13. The pipe illustrated is of rather small diameter relative to the thickness of the pipe wall and pipe embodying the invention would ordinarily be considerably larger in diameter. This pipe is provided with a steel shell or tube 14 which may be fabricated in any desirable way and is preferably made from one or more sheets of steel formed to the desired shape and welded at the abutting edges. In the particular shell shown in Fig. 1 the shell is made up of a plurality of plates 15 with the welded seams 16 joining them together. At the bell end of the pipe a flared ring 17 is provided and secured to the shell 14 by a weld 18 at the inner end of the member 17. Likewise at the other end a spigot ring of metal indicated by numeral 20 is provided and secured to the shell 14 by the weld 21.

In the manufacture of the pipe the shell 14 together with the rings 17 and 20 are first fabricated to the desired tubular shape. After this operation is performed the shell is wrapped with heavy gage wire or wire rodding 24 to provide a reinforcement helical coil 25 about the shell. More than one wire or rod may be used to form the complete coil if necessary. The wire or elongated member 24 is wrapped around the shell under tension and the ends are secured to the shell in any suitable manner so that this reinforcement coil 25 will be maintained under tension. One means of doing this is to weld the ends of the wire 24 to the next adjacent convolution of the coil. This has been indicated in Fig. 3 by the weld 26 at the bell end and the weld 27 at the other. These welds also join the wire rod to the shell.

After the above operation the reinforced shell is lined with concrete 22. This operation may be performed by a centrifugal process or it may be done by some other method.

Following the completion of the lining process an outer coating 28 of concrete is applied around the shell and the reinforcement coil 25. This may be applied by any of the known methods. However, I have found one suitable way of applying the concrete is by the so-called gunite method, that is, by forcing concrete under pressure through an applicator nozzle. The reinforcement coil 25 acts as a means of bonding the coating 28 to the shell making it unnecessary to provide any other reinforcement means for bonding the outer coating to the shell.

The above construction provides a flexible pipe design which permits of the varying of one component in order to meet different strength standards as may be required. It is possible to use a relatively thin shell 14 for all sizes or at least a great many different sizes utilizing different gage wire or rods wrapped therearound. Another way of varying the strength characteristics of the pipe is by varying the spacing of the individual coils of the entire helical winding 25. In this connection it should be pointed out that ordinarily it would probably be preferable to utilize a somewhat closer winding than has been shown, the turns having been spaced rather wide on the drawing to clarify the illustration. By winding the coil under tension the shell is placed under compression thereby increasing its contribution to the overall strength of the completed pipe. The inner coating of course, insures a water tight pipe even with the use of the thin shell.

As an alternate method, the steel shell can be lined before it is wrapped. The lining is allowed to set and it then gives support to the shell and serves to prevent its distortion while the wrapping is applied.

In another form of the invention I utilize a spirally wound steel shell shown in Fig. 4 and indicated by the numeral 30. This shell is made up of one continuous strip of sheet steel 31, the side edges of which are welded to form spiral seams around the pipe. This pipe is also provided with the centrifugally spun lining 22, the helical reinforcement coil 25 and the outer coating of concrete 28. In this form of the invention the reinforcement coil 25 may be wound either in the same direction as the spirally wound shell 30 as it has been shown on the drawing or it may be wound in the reverse direction.

It will be apparent that the construction described provides a composite pipe made up of a welded steel tube or cylinder; helically or spirally wound rods or wire wrapped under tension around the tube or cylinder; a centrifugally spun concrete lining; and a concrete coating applied by cement gun or other suitable means, all of which parts, of this composite pipe, are in intimate contact with the tube or cylinder and all of which act together in resisting stresses, both internal and external, in resisting distortion and deterioration. In addition to this, the interior lining provides an effective seal against leakage from internal pressure in the event of flaws, cracks, holes or other openings which may occur in the tube or cylinder due to corrosion or faulty workmanship or materials.

Although I have particularly shown and described certain forms which my invention may take I contemplate that various changes and modifications may be made without departing from the scope of the invention and I intend to cover such changes as come within the scope of the claim.

I claim as my invention:

A composite pipe comprising: a steel tube; an inner lining of centrifugally spun concrete in said tube; a wire wrapped around said tube in contact therewith and secured thereto, said wire being under tension; and an outer coating of concrete enclosing said wire and tube.

FRED F. JENKINS.